United States Patent
Veilleux, Jr. et al.

(10) Patent No.: US 7,948,417 B2
(45) Date of Patent: May 24, 2011

(54) DIGITAL HARNESS WITH ANALOG INPUTS

(75) Inventors: Leo J. Veilleux, Jr., Wethersfield, CT (US); Peter J. Padykula, Brimfield, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1 day.

(21) Appl. No.: 12/535,109

(22) Filed: Aug. 4, 2009

(65) Prior Publication Data

US 2011/0033190 A1 Feb. 10, 2011

(51) Int. Cl.
*H03M 1/66* (2006.01)

(52) U.S. Cl. .................................... 341/144; 341/155

(58) Field of Classification Search .................. 341/155, 341/144; 174/50, 36; 324/551, 536
See application file for complete search history.

(56) References Cited

U.S. PATENT DOCUMENTS

| | | | |
|---|---|---|---|
| 4,780,631 A * | 10/1988 | Groninger | 310/71 |
| 5,737,403 A | 4/1998 | Zave | |
| 5,748,818 A | 5/1998 | Weiss et al. | |
| 5,896,476 A | 4/1999 | Wisseman et al. | |
| 6,012,852 A | 1/2000 | Kadar-Kallen et al. | |
| 6,045,270 A | 4/2000 | Weiss et al. | |
| 6,276,840 B1 | 8/2001 | Weiss et al. | |
| 6,478,475 B2 | 11/2002 | Schofield et al. | |
| 7,044,795 B2 | 5/2006 | Diep | |
| 7,090,408 B2 | 8/2006 | Brief et al. | |
| 7,255,602 B1 | 8/2007 | Driessen et al. | |
| 7,362,936 B2 | 4/2008 | Stark et al. | |
| 7,527,433 B2 | 5/2009 | Rampulla et al. | |
| 7,724,778 B2 * | 5/2010 | Ying | 370/489 |
| 2007/0206906 A1 | 9/2007 | Stark et al. | |
| 2009/0312892 A1 * | 12/2009 | Mahoney et al. | 701/3 |

OTHER PUBLICATIONS

European Search Report for EP Application No. 10251382.7, Sep. 16, 2010.

* cited by examiner

*Primary Examiner* — Peguy JeanPierre
(74) *Attorney, Agent, or Firm* — Carlson, Gaskey & Olds

(57) ABSTRACT

A digital data harness, uses a signal specific conditioning circuit to interface with analog sensors. The signal specific conditioning circuits convert data signals from analog to digital and thereby allow the signals to be transmitted over a digital data harness.

19 Claims, 1 Drawing Sheet

DIGITAL HARNESS WITH ANALOG INPUTS

BACKGROUND OF THE INVENTION

The present application is directed towards a light weight data wiring harness for a vehicle.

Many modern vehicle applications utilize electronic sensors and controllers in their standard operations. In a typical vehicle, many of the components will require data from sensors or other components to perform their designated function. To facilitate the data transfer between components, most vehicles use a bundle of wires and interconnects, referred to as an electrical harness. The harness can contain thousands of data lines, typically constructed of copper wires, and can be heavy. In such a construction each data line has an interconnect on each end. The interconnects can be plugged into the vehicle components, and data can then be communicated through the harness to a component connected at the opposite end of the data line.

Current state of the art electrical harnesses utilize analog data transmission, requiring a dedicated wire in the harness for each component, as a wire can only transmit a single analog signal at a given time. Analog signals are used because most sensors and other components require analog data or take analog measurements. The use of analog signals further exacerbates the weight issues of the harness because analog signals require a large and complicated Full Authority Digital Engine Control ("FADEC") to properly manage and direct all of the signals to components where they are needed.

In order to reduce the weight of the harness, attempts have been made to utilize digital communications between the components. These attempts have typically been met with failure at least in part because many of the necessary sensors and other components have not been modified to allow for digital communications.

Furthermore, due to the typical environment in which the harness would be used (i.e. a vehicle engine), electrical harnesses are designed to be rugged, and to handle widely varying conditions. The additional materials utilized to ruggedize the harness result in a further increase in weight, and the harness can, therefore, become excessively heavy. In some vehicle applications, such as with aircraft, the reduction of total weight is a design goal and the excessive weight of modern electrical harnesses runs contrary to this goal.

In order to further reduce the weight of electrical harnesses, attempts have been made to incorporate optical data communication into a harness using fiber optic cables instead of electrical data using copper wiring. In current state of the art optical harnesses, the harness has fiber optic cables for communicating data, with optical interconnects, terminating each end of the optical cable. The optical interconnects are then connected to a component incorporating a converter, which converts the data from optical to electrical data which can be used by the device. Alternately, the optical interconnects are connected to an independent signal converter, which is then connected to the component.

Fiber optic systems are also significantly more fragile and susceptible to connection contamination than electrical systems. If a piece of dirt, or grime, works its way into the fiber optic connection, it can block or partially block the light signal being transmitted from the cable to the component, and thereby complicate the data being transmitted. Because of this, current fiber optic harnesses are unsuitable for use in "dirty" environments such as automobile or aircraft electrical harnesses. As a result of the contamination issue, many attempts have been made to ruggedize the interconnects, however due to the fragile nature of optical connections, the attempts have been unsuccessful.

SUMMARY OF THE INVENTION

Disclosed is a digital data harness, which uses a signal specific conditioning circuit to interface with analog sensors. The signal specific conditioning circuits convert signals from analog to digital and allow for the signals to be transmitted over a digital data harness.

Additionally disclosed is an digital interconnect, which terminates a digital communication cable and has a digital to analog/analog to digital signal converter. The interconnect also has a set of electrically coupling pins extending from an analog side of the DA/AD signal converter. A casing surrounds the interconnect such that a portion of the cable, the entirety of the converter, and a portion of each of the analog coupling pins are surrounded and isolated.

Additionally disclosed is a digital harness, which utilizes digital data communication lines for communicating data. Each of the communication lines has an interconnect, which terminates the digital data communication line.

These and other features of the present invention can be best understood from the following specification and drawings, the following of which is a brief description.

DETAILED DESCRIPTION OF THE PREFERRED EMBODIMENT

Figure 1:
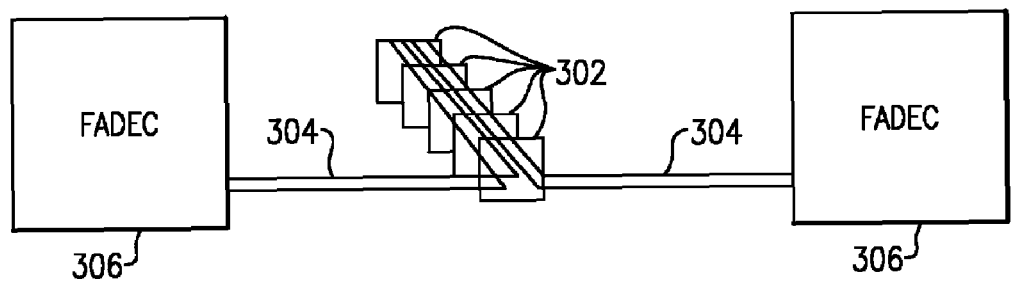
FIG. 1 illustrates a schematic diagram of an example digital data communication harness.

FIG. 1 illustrates a sample system using digital communication over a data harness. The system has a plurality of standard analog sensors 302. The analog sensors 302 each have an analog to digital converter 404 (pictured in FIG. 2) connected to them, which converts an analog data output signal from the analog sensor 302 into a digital format. The digital data can then be communicated over a data line 304 to a FADEC 306 which acts as a hub and manages data along the harness to the appropriate locations. The illustrated example of FIG. 1 includes two data lines 304 and two FADECs 306, thereby allowing each sensor 302 to transmit a reading to multiple FADECs 306. By converting the analog sensor signals into digital, the number of wires in the data harness can be reduced dramatically. While a data line can only transmit one analog signal at a time, the data lines 304 can transmit multiple digital signals simultaneously without any data loss. This allows the harness to be constructed with significantly fewer data lines 304 and reduces the weight. The weight loss is partially offset by the weight gain associated with the digital converter 404, however digital FADECs are lightweight and a net weight loss is still achieved.

Figure 2:
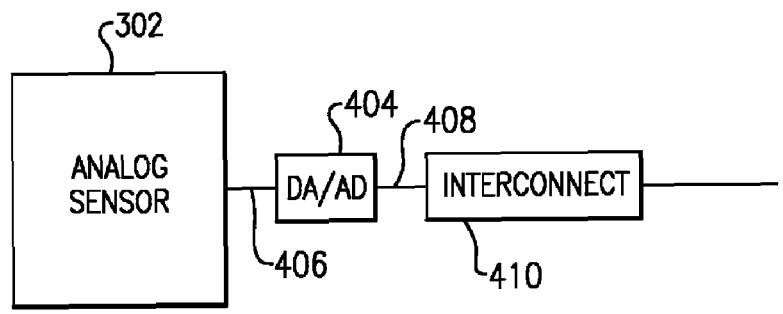
FIG. 2 illustrates a schematic diagram of a sensor interface for converting analog sensor data into digital data for communicating over the harness.

In order to use digital data signals on the line, the analog sensors 302 must have their output converted to a digital signal. FIG. 2 schematically illustrates a system in which the analog sensor signal is converted into a digital signal, and then transmitted over the data harness. The system of FIG. 2 has an analog sensor 302 which has an analog output signal 406. The analog output signal 406 enters a signal specific conditioning circuit 404 which converts the analog output signal 406 into a digital signal 408 which can be transmitted over the data harness. The signal specific conditioning circuit 404 can be connected to the data harness via a standard interconnect 410.

By using a standard interconnect 410 and a signal specific signal condition circuit 404 the data harness becomes compatible with a much wider range of sensor types, as replacing a sensor with a new sensor having a different type of connector no longer requires replacing the entire harness to get a new connector. Rather only the signal specific conditioning circuit 408 needs to be replaced. This allows the data harness to be significantly more upgradeable, and therefore reduces the costs associated with upgrading equipment in the vehicle to which the harness is attached.

Most vehicles currently use sensors and components which are incapable of utilizing a digital data stream directly, and must instead convert the data to digital data using a built in digital to analog/analog to digital (DA/AD) signal converter, or an external DA/AD signal converter must be included along with the component. By moving the DA/AD signal converter into the cable interconnect, the DA/AD signal converter can be sealed thereby preventing the possibility of any environmental contamination working its way into the connections.

Figure 3:
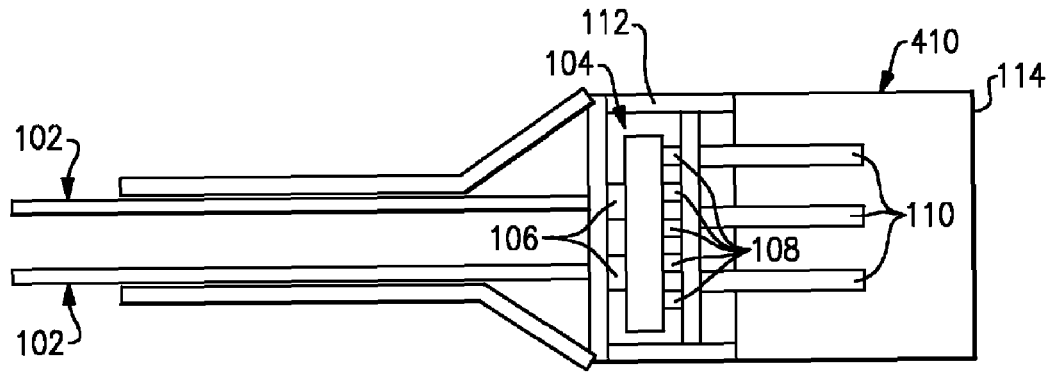
FIG. 3 illustrates a schematic diagram of an example interconnect incorporating the optical to electrical signal converter.

While digital electrical connectors are known, there remains no standard connector for ruggedly connecting a digital data harness to an analog sensor. FIG. 3 illustrates a standard interconnect 410 for connecting a digital communication cable 102 to an analog data port on a component, such as would be used in the example of FIG. 2. The interconnect 410 has a DA/AD signal converter 104 built in. The signal converter 104 has a set of digital inputs/outputs 106, and a plurality of analog inputs/outputs 108. Each of the analog inputs/outputs 108 is connected to an analog connector pin 110. An interconnect casing 112 completely encloses the DA/AD signal converter 104, and can be hermetically sealed to further prevent contamination and electromagnetic interference (EMI). The interconnect 410 also includes a plug portion 114 which can be shaped to ensure that the interconnect is properly connected to an input port on a desired component. Power may be provided across the digital harness by separate power and return lines or provided directly on the digital signal data lines.

The interconnect 410 of FIG. 3 has an initial digital data stream transmitted over the digital communication cable 102. When the data stream reaches the interconnect 410, it is accepted by the digital inputs/outputs 106 of the DA/AD signal converter 104. The DA/AD signal converter 104 then uses known conversion techniques to convert the data signal from a digital signal to an analog signal and outputs an analog data signal at the analog inputs/outputs 108. The analog inputs/outputs 108 are connected to analog coupling pins 110, which are then plugged into a data port of the component to which the data is being supplied.

In order to prevent contamination, an interconnect casing 112 completely encases the DA/AD signal converter, as well as partially encases the digital communication cable 102, and the analog coupling pins 110. The encasing can be done using any suitable potting material which does not conduct electricity, as well as does not create an obstruction in the digital connections. Alternately, if the interconnect casing 112 is sealed in such a way that it is airtight ("hermetically sealed"), the interconnect casing 112 can have no potting material and still maintain rugged characteristics. Such an interconnect 410 would prevent contamination of the connections as long as the interconnect casing 112 remained hermetically sealed. In addition, the electrical assembly may be fully enclosed with an electrically conductive casing and electrically terminated to act as a faraday shield for EMI and Lightning protection. Furthermore, the digital signals and power may be electrically isolated by means such as opto-isolators or transformers.

By entirely surrounding all the connections between the digital communication cable 102 and the DA/AD signal converter 104, the interconnect casing 112 prevents any dirt, grime, or other materials from contaminating the connection and interfering with the data transfer. The interconnect casing prevents contamination both during ordinary usage and during installation/maintenance as connecting and disconnecting the cable never exposes the optical connections.

Furthermore, the DA/AD signal converter 104 can be a bidirectional converter to allow for an analog sensor 302 to both transmit data signals over the data harness and receive data signals from the data harness. Without bidirectional functionality, the DA/AD signal converter 104 can only convert from either digital data to analog data, or convert from analog data to digital data. The additionally functionality provided by a bidirectional DA/AD signal converter 104 allows the data harness to be further upgradable, as it allows a single standard interconnect 410 to be used for either data input or data output.

As an alternate configuration to FIG. 3, the DA/AD signal converter 104 could be replaced by an electrical to optical signal converter. This example additionally replaces the digital communication wires 102 with fiber optic cables, allowing for a lighter data harness. Such an alternate example would function similarly to the above example and would fall within the above disclosure.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A digital communication cable comprising;
   at least one digital communication wire;
   a digital to analog/analog to digital (DA/AD) signal converter having a digital connection on a first end, and an analog connection on a second end, the DA/AD signal converter terminating said at least one digital communication wire;
   a set of connector pins connected to said analog connection; and
   an interconnect casing encompassing a portion of said digital communication cable, said DA/AD converter, and a portion of each of said set of connector pins.

2. The digital communication cable of claim 1, wherein said interconnect casing is hermetically sealed and faraday shielded such that contamination of the DA/AD signal converter is prevented.

3. The digital communication cable of claim 1, wherein said DA/AD signal converter is a bidirectional converter.

4. The digital communication cable of claim 1, additionally comprising a power transmission component.

5. The digital communication cable of claim 1, wherein said at least one digital communication wire is a fiber-optic wire.

6. The digital communication cable of claim 5, wherein said DA/AD signal converter further comprises an electrical to optical signal converter.

7. A data harness for an aircraft comprising;
a plurality of digital communication cables, each of said digital communication cables having a digital interconnect on at least one end;
said digital interconnect comprising a digital to analog/analog to digital (DA/AD) signal converter having a digital connection on a first end, and an analog connection on a second end; a set of connector pins connected to said analog connection; and an interconnect casing which encompasses a portion of the digital communication cable, the DA/AD signal converter, and a portion of the connector pins.

8. The data harness of claim 7, wherein said interconnect casing is hermetically sealed.

9. The data harness of claim 8, wherein said interconnect casing comprises a faraday shield.

10. The data harness of claim 9, wherein said interconnect casing is electrically terminated.

11. The data harness of claim 8, wherein said interconnect casing is at least partially filled with a non-electrically conductive potting material.

12. The data harness of claim 7, wherein said DA/AD signal converter is bidirectional.

13. The data harness of claim 7, wherein each of said digital communication cables is capable of transmitting a plurality of digital data signals simultaneously.

14. The data harness of claim 7, wherein said digital communication cables comprise fiber optic cables and said DA/AD converter comprises an electrical to optical data converter.

15. The data harness of claim 7, wherein said digital communication cables comprises at least a power transmission cable.

16. A system for connecting analog components to a digital data harness comprising;
a digital data harness comprising a plurality of cables;
at least one analog component having an analog output;
a signal specific conditioning circuit connecting said at least one analog component to said digital data harness, such that analog data is converted into digital data in said signal specific conditioning circuit, and transmitted over said digital data harness to at least one destination, wherein said signal specific conditioning is incorporated into at least one of said plurality of cables.

17. The system of claim 16, wherein said at least one destination comprises a digital data box capable of routing said data to a desired component.

18. The system of claim 16, wherein said digital harness comprises;
at least one optical cable;
an optical to electrical signal converter having an optical connection on a first end, and an electrical connection on a second end, the optical to electrical signal converter terminating the at least one optical fiber;
a set of connector pins connected to said electrical connection; and
an interconnect casing encompassing a portion of said optical cable, said converter, and a portion of each connector in said set of connector pins.

19. The system of claim 16, wherein said digital harness comprises a plurality of data lines and each of said data lines is capable of communicating multiple digital data signals simultaneously.

* * * * *